United States Patent
Surdu

(10) Patent No.: US 8,889,246 B2
(45) Date of Patent: Nov. 18, 2014

(54) MOLDED INTERIOR TRIM PANEL WITH UNDERCUT FLANGE

(75) Inventor: Dennis M. Surdu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 576 days.

(21) Appl. No.: 13/344,695

(22) Filed: Jan. 6, 2012

(65) Prior Publication Data

US 2013/0177744 A1 Jul. 11, 2013

(51) Int. Cl.
*B60J 5/00* (2006.01)

(52) U.S. Cl.
USPC ............ 428/172; 428/72; 428/137; 428/157; 428/161; 428/163; 428/192; 296/146.7

(58) Field of Classification Search
CPC .... B60J 13/02; B60J 13/0237; B60J 13/0243; B60J 13/0256; B60J 13/0206; B60J 2013/0293; B32B 3/04; B32B 3/263; B32B 3/266
USPC .............. 428/68, 72, 81, 121, 122, 137, 157, 428/161, 163, 172, 192; 264/146.7
See application file for complete search history.

(56) References Cited

U.S. PATENT DOCUMENTS

| | | | |
|---|---|---|---|
| 5,139,604 A | 8/1992 | Mitchell | |
| 5,820,191 A * | 10/1998 | Blakewood et al. | ....... 296/37.13 |
| 5,992,914 A | 11/1999 | Gotoh | |
| 6,170,902 B1 | 1/2001 | Sakuma | |
| 6,722,730 B2 | 4/2004 | Lydan | |
| 6,893,077 B1 | 5/2005 | Dejongh | |
| 7,033,660 B2 * | 4/2006 | Cowelchuk et al. | ............ 428/71 |
| 8,011,717 B2 | 9/2011 | Endo | |
| 2006/0141240 A1 * | 6/2006 | Ota et al. | ................... 428/319.3 |

* cited by examiner

*Primary Examiner* — Donald J Loney
(74) *Attorney, Agent, or Firm* — Vichit Chea; MacMillan, Sobanski & Todd, LLC

(57) ABSTRACT

A plastic-molded trim panel component has a substrate having a Class A contoured surface for facing a vehicle interior and a Class B rear surface defining a maximum sheet thickness. The substrate has a plurality of mounting extensions extending from the Class B rear surface in a die-draw direction. A flexible skin is wrapped over the Class A surface and bonded to the Class B surface. The Class A surface includes a flange surface having an outer-pointing normal extending less than 90° from the die-draw direction. The flange surface has an edge-to-edge width greater than the maximum sheet thickness. The substrate includes a plurality of ribs substantially aligned with the die-draw direction having rib edges defining at least one mouth opening, wherein the rib edges and mouth opening conform to the flange surface. The flexible skin is suspended over the mouth opening and against the rib edges.

6 Claims, 6 Drawing Sheets

MOLDED INTERIOR TRIM PANEL WITH UNDERCUT FLANGE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to interior trim panels for transportation vehicles, and, more specifically, to a trim panel and manufacturing method to provide a contoured panel shape with an undercut edge without adding expensive or complex manufacturing equipment.

Interior trim panels for cars, trucks, and other transportation vehicles are designed to be both functional and stylish. As a result, complex contoured surfaces are often utilized in designing vehicle interior surfaces.

A typical interior trim panel surface may comprise an instrument panel, dashboard, or door panel formed as a generally thin wall having various features such as mounting extensions for attaching the panel to a vehicle frame and apertures and/or mating bosses for attaching various accessories to the trim panel. For mass-produced vehicles, trim panels are typically made from plastic materials that are injection molded with a generally uniform thickness. The uniform thickness achieves uniform cooling of the plastic material to avoid sags or other distortions in the panel that would result if some portions of the visible surface cooled faster than others. Mounting extensions such as clip towers add thickness to a panel but have a sufficiently small profile on the visible surface to leave the wall generally unaffected.

The molded panel (also known as a substrate) has what is known as a Class A surface facing the vehicle interior so that it is visible to the vehicle occupants and what is known as a Class B surface on the opposite or rear side. A smooth, well-controlled Class A surface is critical to obtaining a quality appearance. To obtain certain curved or sculptured surfaces, complex tooling with many movable die parts and draw movements may be required. Complex tooling results in increased manufacturing costs and may result in increased production of scrap.

An undercut surface such as an undercut flange running along an edge of a trim piece may be especially difficult to manufacture. An undercut as used herein means that an outer-pointing normal extending outwardly at each point in the contoured surface swings from a first direction at one location on the surface to a second direction more than 90° away from the first direction at a second place on the undercut of the surface. For such a complex contoured surface wherein the undercut faces an opposite direction from the main portion of the Class A surface, a die-locked situation may be created. The least expensive and least complicated injection molding process utilizes straight-pull die movements. In a die locked situation, a portion of the mold metal would need to pass through a part of the injected plastic in order to be removed in a straight pull. Thus, undercuts typically require portions of the die to pull out in a sideways direction, perpendicular to the direction of a straight-pull. The side actions increase manufacturing complexity and cost. In a trim substrate having mounting extensions formed on the Class B surface that extend in a die draw direction, the conventional straight-pull molding tools could not accommodate such an undercut.

SUMMARY OF THE INVENTION

In one aspect of the invention, a plastic-molded interior trim panel component for an interior of a vehicle comprises a substrate having a Class A contoured surface for facing the interior and a Class B rear surface defining a maximum sheet thickness of the substrate. The substrate has a plurality of mounting extensions extending from the Class B rear surface in a die-draw direction. A flexible skin is wrapped over the Class A contoured surface and bonded to the Class B rear surface. The Class A contoured surface includes a flange surface having an outer-pointing normal extending less than 90° from the die-draw direction. The flange surface has an edge-to-edge width greater than the maximum sheet thickness. The substrate includes a plurality of ribs substantially aligned with the die-draw direction having rib edges defining at least one mouth opening, wherein the rib edges and mouth opening conform to the flange surface. The flexible skin is suspended over the mouth opening and against the rib edges.

DETAILED DESCRIPTION OF PREFERRED EMBODIMENTS

Figure 1:
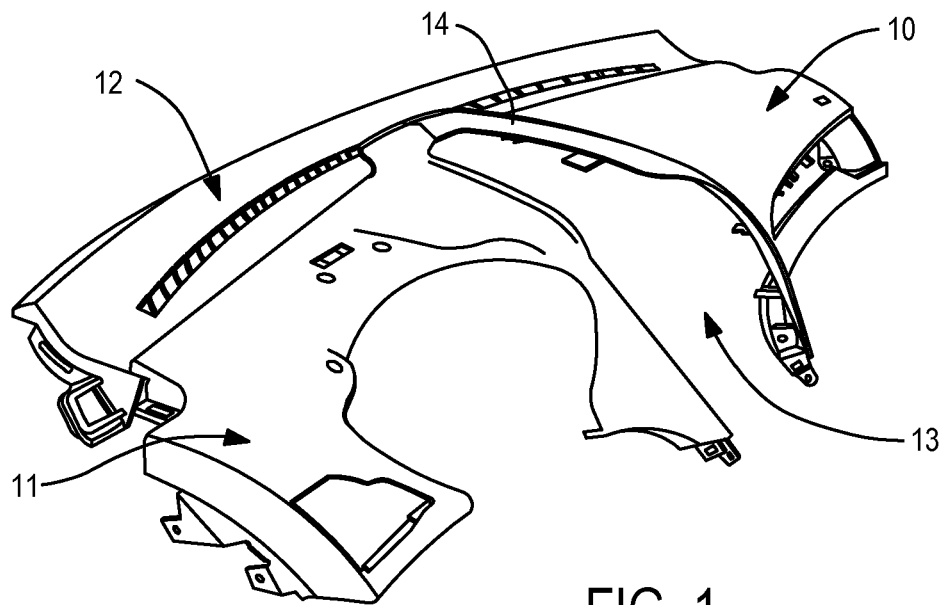
FIG. 1 is a perspective view of an instrument panel in one embodiment of the present invention.
Figure 2:
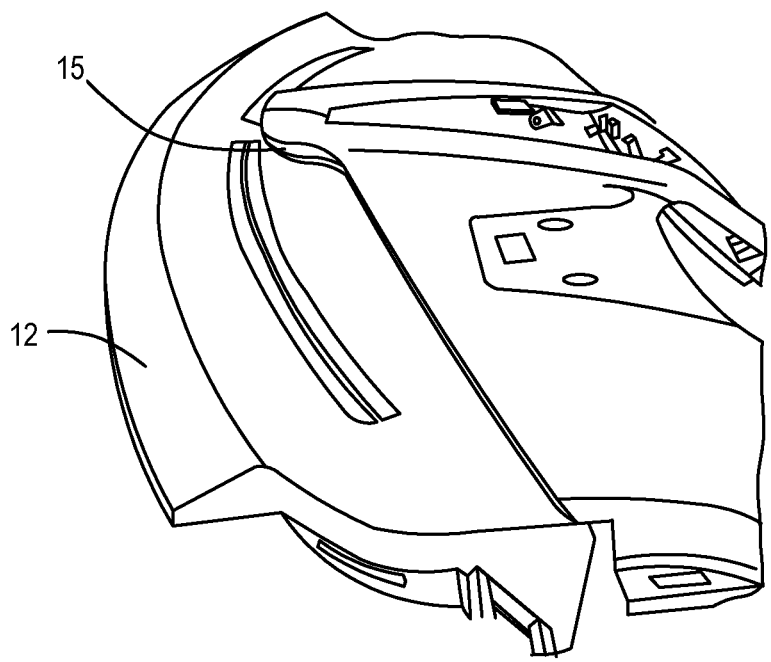
FIG. 2 is a perspective view of the instrument panel of FIG. 1 showing an undercut.

Referring now to FIG. 1, an instrument panel trim system is comprised of a passenger section 10, a driver section 11, and a defroster grid section 12. A center opening 13 between sections 10 and 11 accommodates a center stack of a vehicle (not shown). A raised rim 14 extends around center opening 13. As best shown in FIG. 2, an undercut 15 extending along the forward edges of sections 10 and 11 which helps to conceal the edge of defroster section 12 and to create a tiered appearance.

Figure 3:
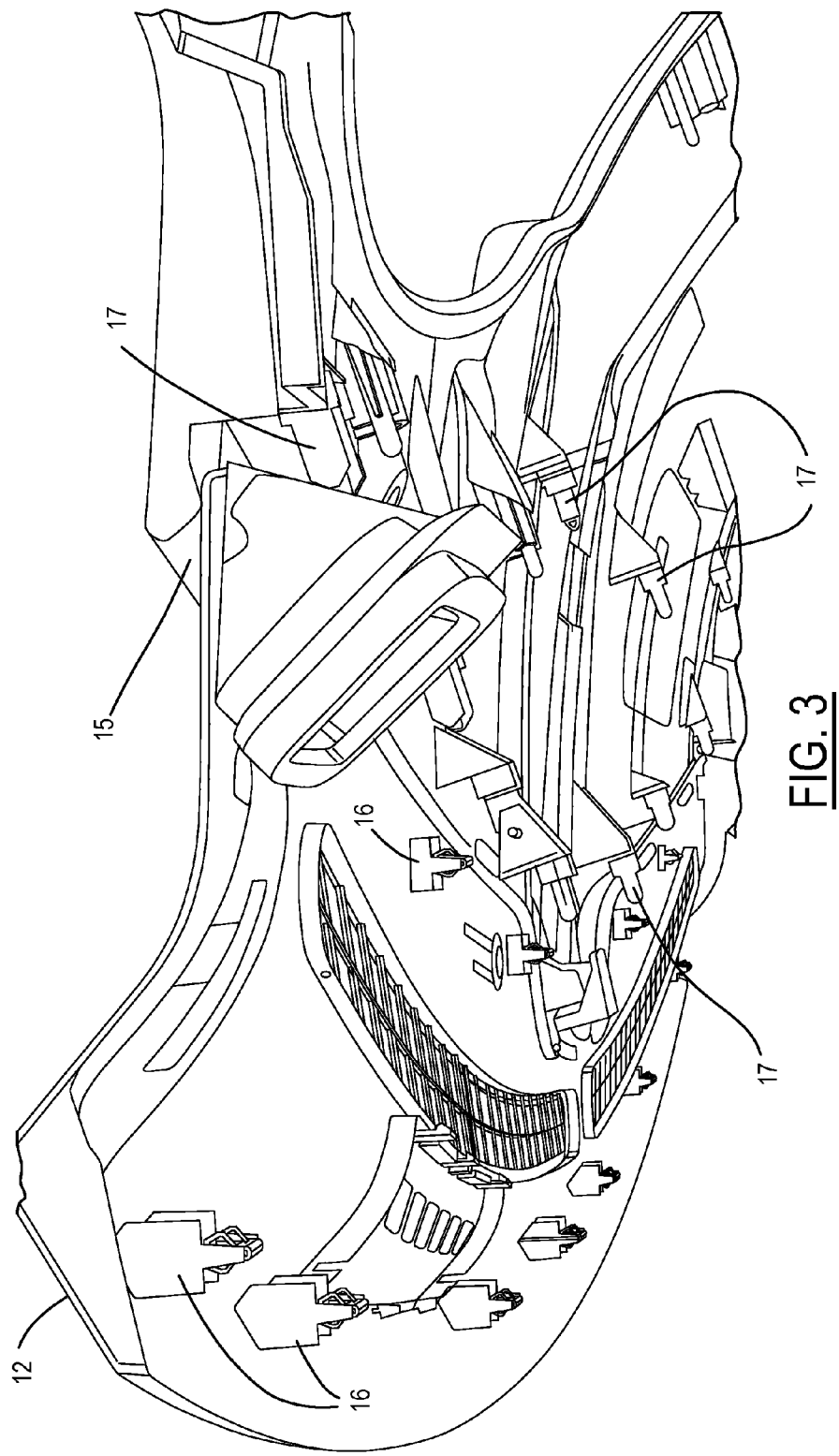
FIG. 3 is a perspective view showing a portion of the Class B side of the instrument panel of FIG. 1.

The Class A contoured surfaces of sections 10-12 are viewed in FIGS. 1 and 2. In FIG. 3, a portion of the Class B surfaces are shown, which includes clip towers 16 on defrost section 12, and clip towers 17 on passenger section 10 and driver section 11. Clip towers 16 extend vertically downward from defrost section 12. The vertically downward direction coincides with a die-draw direction during the molding of defrost section 12. Since defrost section 12 has no undercuts, it can be made using a standard straight-pull die arrangement in which one die creates the Class A surface and another die creates the Class B surface.

Since the supporting structure is behind rather than below sections 10 and 11, the plurality of clip towers 17 extend forwardly to attach to a vehicle frame (not shown). Undercut 15 follows a contour on the Class A surface in which an outer-pointing normal varies from a first direction extending away from (i.e., more than 90° away from) the die-draw direction of clip tower 17 to a second direction at the undercut section wherein the outer-pointing normal extends less than 90° from the die-draw direction. When the outer-pointing normal is less than 90° from the die-draw direction, the corresponding inner-pointing normal on the Class B surface is directed away from (i.e., more than 90° from) the die-draw direction. This orientation gives rise to the die-locked condition.

Figure 4:
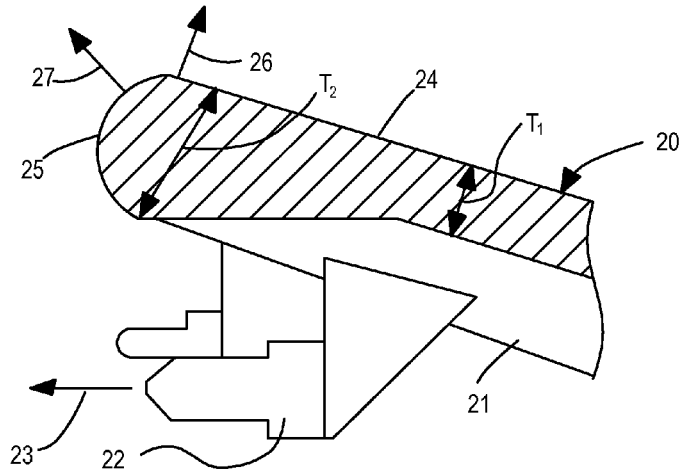
FIG. 4 is a partial cross section showing a thickened panel for forming an undercut flange.

FIG. 4 shows one potential solution to the die-locked problem that arises when a trim panel 20 has a Class B surface 21 supporting clip towers 22 extending in a die-draw direction 23. As described above, Class A surface 24 includes an undercut 25 contoured in a manner that results in the outer-pointing normal changing direction along the contour of undercut 25 from being oriented away from die-draw direction 23 as shown by normal 26 (i.e., greater than 90° from die-draw direction 23) to being oriented less than 90° from die-draw direction 23 as shown by normal 27. Panel 20 has a first wall thickness $T_1$ over a majority of its area and has a larger thickness $T_2$ at its edge in order to provide undercut flange 25. However, an increased thickness is undesirable due to differences in cooling times that create distortions in the Class A surface. Furthermore, the requirement for a straight-pull arrangement of the die parts may result in a parting line on the Class A surface.

Figure 5:
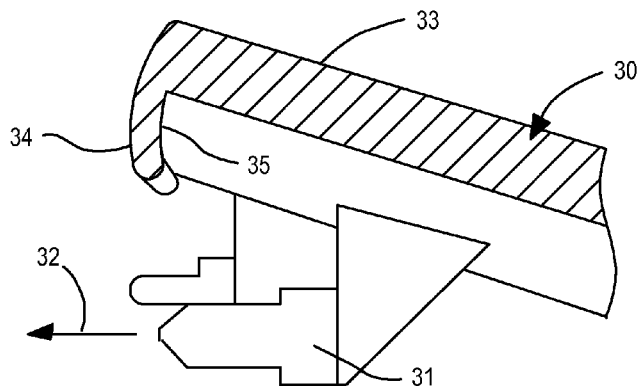
FIG. 5 is a partial cross section showing a die-locked configuration for forming an undercut flange.

To maintain consistent wall thickness, straight-pull tooling can be abandoned for more complex tooling. FIG. 5 shows a trim panel 30 having clip towers 31 defining a die-draw direction 32. Class A surface 33 includes an undercut 34 without increasing the thickness of panel 30. However, a die-locked surface 35 is created which requires the tooling to perform a side pull, which can be undesirable.

Figure 6:
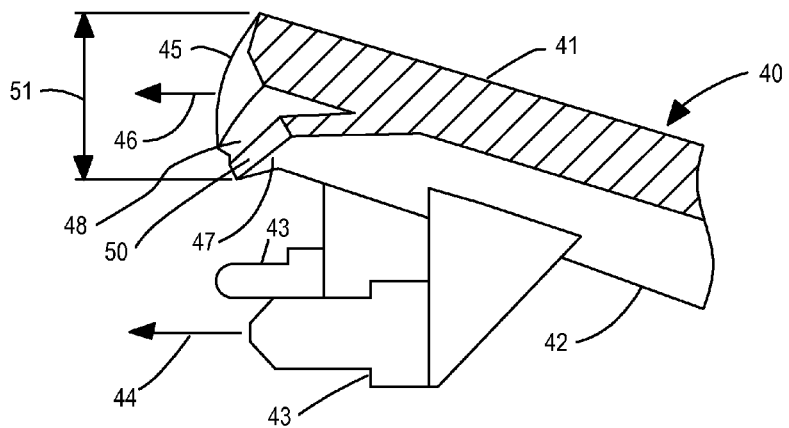
FIG. 6 is a partial cross section showing an undercut flange formed by a ribbed structure for receiving a suspended skin according to one embodiment of the invention.

Formation of an undercut according to the present invention is shown in greater detail in FIG. 6. An interior trim panel 40 has a Class A surface 41 and a Class B surface 42. A plurality of mounting extensions 43 extending in a die-draw direction 44 from surface 42. Class A surface 41 is contoured with an undercut flange. More specifically, a flange surface of the undercut has an outer-pointing normal 46 that extends less than 90° from die-draw direction 44. In order to create the flange surface, a rib 47 extends from Class B surface 42 in a direction that is substantially aligned with die-draw direction 44. Rib 47 has a rib edge 50 that is spaced from a main wall edge 45 that likewise acts as a rib edge to define a mouth or cavity 48. Rib edges 45 and 50 conform with the desired flange surface of the undercut. To provide a smooth, uninterrupted undercut surface, a flexible skin is wrapped over rib edges 45 and 47 so that the skin is suspended over mouth 48 as is described below. The flange surface has an edge-to-edge width 51 which is greater than the maximum thickness of the main wall sections of panel 40. Therefore, an apparent thickness is obtained for the undercut flange surface that exceeds the actual manufactured thickness without experiencing the drawbacks of thicker injected material as described in connection with FIG. 4.

Figure 7:
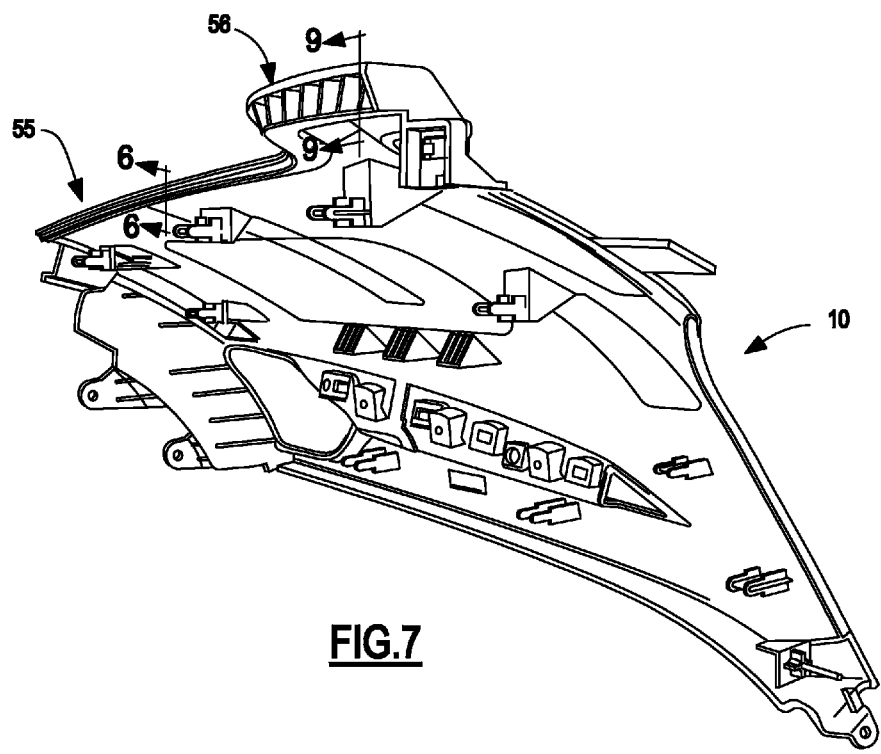
FIG. 7 is a perspective view of a substrate with an extended rib structure.
Figure 8:
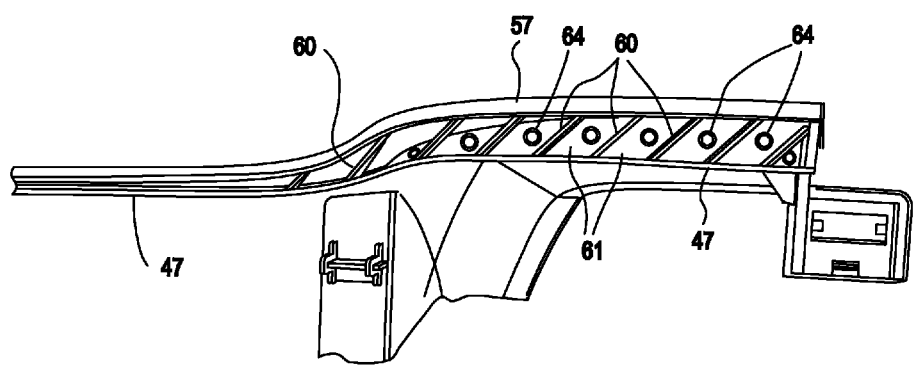
FIG. 8 is a side view illustrating ribs and vent holes.

FIGS. 7 and 8 illustrate a variable thickness (i.e., height) of the flange surface according to the embodiment of FIGS. 1-3. Thus, a first flange section 55 with a relatively narrow edge-to-edge width blends into a second flange section 56 with a relatively greater edge-to-edge width. Rib 47 is shown extending horizontally defining a lower edge of the flange surface. As the flange edge-to-edge width increases, rib 47 is progressively further away from an upper edge 57 of the flange surface. In order to properly support the flexible skin, a plurality of cross-ribs 60 are added that extend between edge ribs 47 and 57 such that consecutive cross-ribs 60 define respective mouth openings 61. Each of cross-ribs 60 and mouth openings 61 conform to the flange surface so that when the flexible skin is suspended over the ribs and mouth opening, the desired undercut is obtained.

Figure 9:
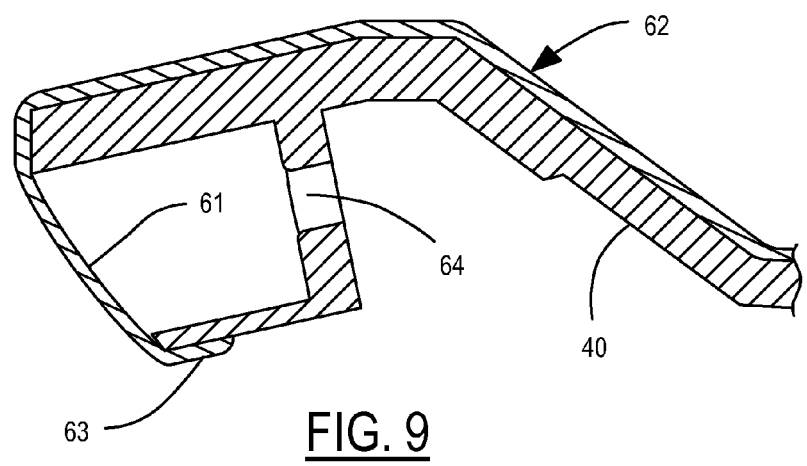
FIG. 9 is a cross section showing a rib cavity and flexible skin.

FIG. 9 shows a cross-sectional view indicated by lines 9-9 in FIG. 7. In FIG. 9, a flexible skin 62 has been overlain and bonded to panel 40 so that it is suspended over a mouth opening 61. Flexible skin 62 may be comprised of a vinyl sheet or a leather sheet and is attached (e.g., adhesively bonded) as known in the art. Hand wrapping of the flexible skin onto the substrate and the application of heat to conform the skin with the substrate shape are conventionally used. Skin 62 is bonded onto the Class B surface at 63 and at along other portions of the Class B surface, resulting in a smooth undercut surface as determined by the rib edges along the flange surface. In order to avoid pressure induced distortions of skin 62 where it is suspended over mouth 60, one or more vent holes 64 are provided in the rib structure at locations remote from mouth opening 60 that can conduct air into or out of the cavities in order to equalize pressure across skin 60. As shown in FIG. 8, a respective vent hole 64 may preferably be provided between each consecutive cross-rib 60 so that none of the cavities between cross-ribs are sealed.

Figure 10:
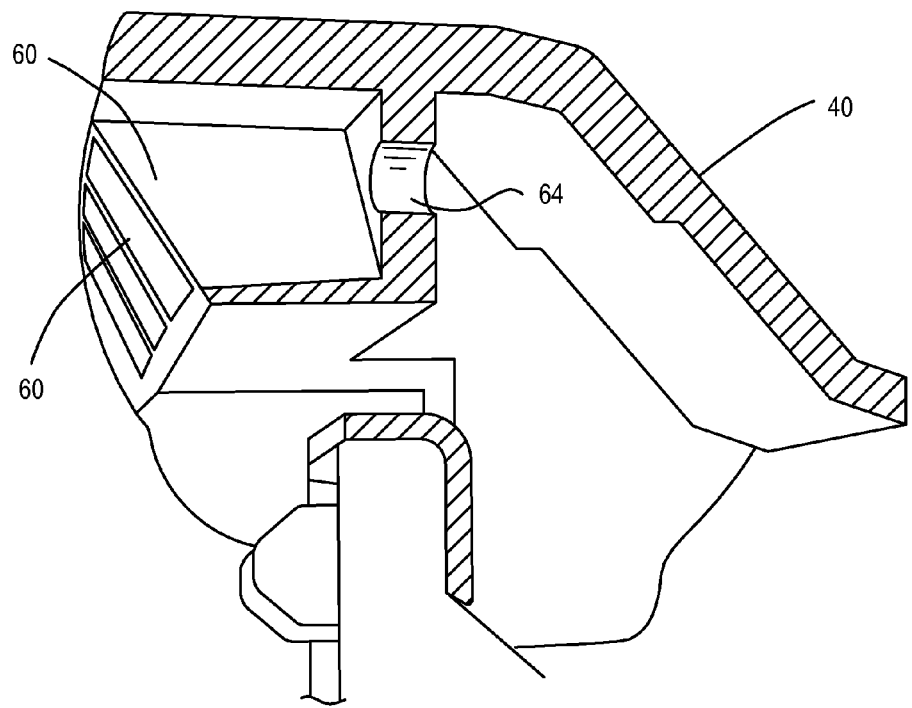
FIG. 10 is a perspective view and partial cross section through a rib cavity.

As shown in FIGS. 8 and 10, cross-ribs 60 are preferably oriented substantially diagonally to edges 47 and 57. Preferably, each cross-rib 60 intersects edges 47 and 57 at an angle of about 45°. Each rib is thus easily formed using the same die-draw direction as the mounting extensions while avoiding large areas of flexible skin being unsupported. The ribs may preferably be spaced at a minimum of about 10 millimeters apart.

Figure 11:
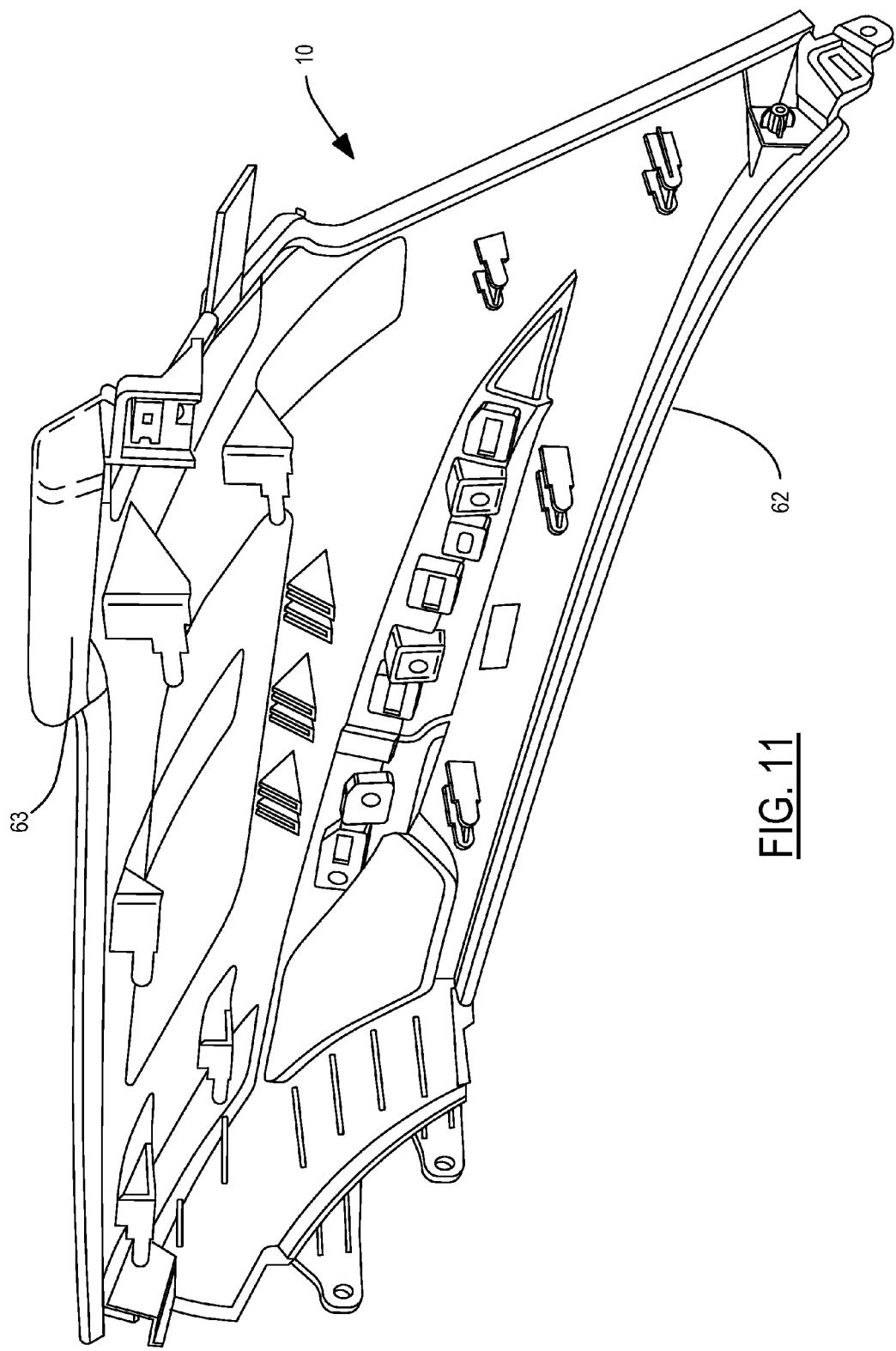
FIG. 11 is a perspective view showing the instrument panel substrate after wrapping with the flexible skin.

FIG. 11 illustrates trim panel section 10 after application of flexible skin 62. Skin 62 folds over from the Class A side to the Class B side along contoured flange surface 63, and it is bonded to the Class B side. The undercut flange surface is indistinguishable from a flange formed of solid injection molded material.

What is claimed is:

1. A plastic-molded interior trim panel component for an interior of a vehicle, comprising:
    a substrate having a Class A contoured surface for facing the interior and a Class B rear surface defining a maximum sheet thickness of the substrate, wherein the substrate has a plurality of mounting extensions extending from the Class B rear surface in a die-draw direction; and
    a flexible skin wrapped over the Class A contoured surface and bonded to the Class B rear surface;
    wherein the Class A contoured surface includes a flange surface having an outer-pointing normal extending less than 90° from the die-draw direction, and wherein the flange surface has an edge-to-edge width greater than the maximum sheet thickness;
    wherein the substrate includes a plurality of ribs substantially aligned with the die-draw direction having rib edges defining at least one mouth opening, wherein the rib edges and mouth opening conform to the flange surface, and wherein the flexible skin is suspended over the mouth opening and against the rib edges.

2. The trim panel component of claim 1 wherein the plurality of ribs includes:
- a first edge rib and a second edge rib defining the edge-to-edge width of the flange surface; and
- a plurality of cross ribs, each cross rib extending between the first edge rib and the second edge rib, consecutive cross ribs defining a respective mouth opening.

3. The trim panel component of claim 2 wherein the cross ribs each intersect with the first and second rib edges at an angle of about 45°.

4. The trim panel component of claim 1 wherein at least one rib includes a vent hole remote from the mouth opening for equalizing pressure across the flexible skin suspended over the mouth opening.

5. The trim panel component of claim 1 wherein the flexible skin is comprised of a vinyl sheet.

6. The trim panel component of claim 1 wherein the flexible skin is comprised of a leather sheet.

\* \* \* \* \*